United States Patent
Lin et al.

(10) Patent No.: US 11,629,589 B2
(45) Date of Patent: Apr. 18, 2023

(54) FERROMAGNETIC OBJECT DETECTION DEVICE AND METHOD FOR DETECTING TUBING COUPLING

(71) Applicant: YANTAI JEREH PETROLEUM EQUIPMENT & TECHNOLOGIES CO., LTD., Shandong (CN)

(72) Inventors: Haojie Lin, Shandong (CN); Xin Wang, Shandong (CN); Haiping Xing, Shandong (CN); Feng Gao, Shandong (CN); Shouzhe Li, Shandong (CN); Kai Wang, Shandong (CN); Mingxing Li, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 102 days.

(21) Appl. No.: 17/370,877

(22) Filed: Jul. 8, 2021

(65) Prior Publication Data
US 2022/0372865 A1 Nov. 24, 2022

(30) Foreign Application Priority Data

May 20, 2021 (CN) .......................... 202110552115.1

(51) Int. Cl.
*E21B 47/092* (2012.01)
*G01V 11/00* (2006.01)

(52) U.S. Cl.
CPC .......... *E21B 47/092* (2020.05); *G01V 11/00* (2013.01)

(58) Field of Classification Search
CPC .............................. E21B 47/092; G01V 11/00

USPC .......................................................... 340/551
See application file for complete search history.

(56) References Cited

U.S. PATENT DOCUMENTS

| 4,492,115 A * | 1/1985 | Kahil | E21B 17/006 73/152.01 |
|---|---|---|---|
| 4,710,712 A * | 12/1987 | Bradfield | G01N 27/9026 324/242 |
| 4,964,462 A | 10/1990 | Smith | |
| 2003/0193329 A1* | 10/2003 | Relton | E21B 47/092 324/235 |

FOREIGN PATENT DOCUMENTS

| CA | 2536451 A1 | 8/2007 |
|---|---|---|
| CN | 201953376 U | 8/2011 |
| CN | 103063737 A | 4/2013 |
| CN | 102606142 B | 12/2014 |
| CN | 104564033 A | 4/2015 |
| CN | 103412343 B | 1/2016 |
| CN | 107882550 A | 4/2018 |

(Continued)

*Primary Examiner* — Kerri L McNally
(74) *Attorney, Agent, or Firm* — Crowell & Moring LLP

(57) ABSTRACT

Embodiments of the present disclosure provide a ferromagnetic object detection device and a method for detecting a tubing coupling. The ferromagnetic object detection device includes a support tube, a magnetic field generating device and a magnetic detection device. The support tube includes a space penetrating in a first direction; the magnetic field generating device is located on an outer sidewall of the support tube and configured to generate a magnetic field; the magnetic field detection device includes a first magnetic field detection element, a second magnetic field detection element and a third magnetic field detection element.

15 Claims, 3 Drawing Sheets

(56) References Cited

FOREIGN PATENT DOCUMENTS

| | | |
|---|---|---|
| CN | 103649461 B | 12/2018 |
| CN | 208254392 U | 12/2018 |
| CN | 109184673 A | 1/2019 |
| CN | 108051499 B | 5/2020 |
| CN | 211374614 U | 8/2020 |
| CN | 212389330 U | 1/2021 |
| EP | 0412535 B1 | 5/1994 |

* cited by examiner

FERROMAGNETIC OBJECT DETECTION DEVICE AND METHOD FOR DETECTING TUBING COUPLING

For all purposes, the present application claims priority from Chinese Patent Application No. 202110552115.1 filed on May 20, 2021, and the content disclosed in the above-mentioned Chinese patent application are hereby incorporated in its entirety as a part of the present application.

TECHNICAL FIELD

Embodiments of the present disclosure relate to a ferromagnetic object detection device and a method for detecting a tubing coupling.

BACKGROUND

In some pressurized operations in oil and gas fields, such as in workover and logging operations, it is often needed to lift and lower the tubing under pressure in an oil and gas well. Upon the tubing coupling approaching a position where the wellhead ram blowout preventer is located, it is needed to open the wellhead ram blowout preventer quickly so that the tubing can pass smoothly. Therefore, in order to ensure that the tubing can pass through the wellhead ram blowout preventer smoothly, it is needed to master the position of the coupling.

At present, in the process of lifting and lowering the tubing, one method is that the operator visually estimates the position of the coupling according to experience, but this method is easy to cause safety accidents (such as blowout) due to operator mistakes; another method is to use a detection device to automatically detect the position of the coupling. However, the existing detection device is difficult to obtain accurate detection results under complex working conditions of oil wells. For example, it is easy to misjudge when the tubing shakes or there are impurities such as oil stains in oil and gas well, which may also lead to safety accidents, and its practical application effect is poor. Therefore, it is a technical problem to be solved in this field that how to avoid the interference of tubing shaking and other factors and accurately detect the position of the tubing coupling.

SUMMARY

Embodiments of the present disclosure provide a ferromagnetic object detection device and a method for detecting a tubing coupling. The ferromagnetic object detection device includes a support tube, a magnetic field generating device and a magnetic detection device. The support tube includes a space penetrating in a first direction; the magnetic field generating device is located on an outer sidewall of the support tube and configured to generate a magnetic field; the magnetic field detection device includes a first magnetic field detection element, a second magnetic field detection element and a third magnetic field detection element. The ferromagnetic object detection device provided by the embodiments of the present disclosure can respectively detect the moving speed, size and position of the ferromagnetic object passing through the detection device, thereby realizing accurate detection of the ferromagnetic object.

One embodiment of the present disclosure provides a ferromagnetic object detection device, including: a support tube, including a space penetrating in a first direction; a magnetic field generating device, located on an outer sidewall of the support tube and configured to generate a magnetic field; and a magnetic field detection device, including a first magnetic field detection element, a second magnetic field detection element and a third magnetic field detection element. The first magnetic field detection element, the second magnetic field detection element and the third magnetic field detection element are all located on the outer sidewall of the support tube and within a range of the magnetic field generated by the magnetic field generating device; the first magnetic field detection element is configured to detect the magnetic field and obtain a first magnetic field signal to obtain a moving speed of a ferromagnetic object passing through the space in the first direction, the second magnetic field detection element is configured to detect the magnetic field and obtain a second magnetic field signal to obtain a size of the ferromagnetic object in a second direction perpendicular to the first direction, and the third magnetic field detection element is configured to detect the magnetic field and obtain a third magnetic field signal to obtain a position of the ferromagnetic object.

In some examples, the magnetic field generating device is an excitation coil, the excitation coil is wound on the outer sidewall of the support tube.

In some examples, the first magnetic field detection element is a detection coil, and in the second direction, the detection coil is located between the support tube and the magnetic field generating device.

In some examples, the second magnetic field detection element includes at least one magnetic sensor group, and each magnetic sensor group includes two first magnetic sensors which are symmetrically arranged about the central axis of the support tube.

In some examples, the second magnetic field detection element includes a plurality of magnetic sensor groups, the plurality of magnetic sensor groups are arranged on two sides of the magnetic field generating device in the first direction.

In some examples, the third magnetic field detection element includes a plurality of second magnetic sensors arranged in the first direction.

In some examples, the plurality of second magnetic sensors are equidistantly arranged in the first direction.

In some examples, in the second direction, the third magnetic field detection element is located between the support tube and the magnetic field generating device; in the first direction, the third magnetic field detection element is spaced apart from the first magnetic field detection element.

In some examples, the support tube includes a first connection end and a second connection end which are oppositely arranged in the first direction.

In some examples, the support tube further includes a first barrier plate and a second barrier plate which are arranged on the outer sidewall at intervals, in the first direction, the first barrier plate and the second barrier plate are located between the first connection end and the second connection end, a first annular groove is formed between the first barrier plate and the second barrier plate, and the magnetic field generating device is wound in the first annular groove.

In some examples, the support tube further includes a second annular groove, the second annular groove is recessed from a bottom of the first annular groove to the space in the second direction, and the first magnetic field detection element is wound in the second annular groove.

In some examples, the ferromagnetic object detection device further includes a controller and an audible and visual alarm, wherein the audible and visual alarm is in communication connection with the controller, and the controller is respectively in communication connection with the first magnetic field detection element, the second magnetic field detection element and the third magnetic field detection element, and the controller is configured to control whether the audible and visual alarm sends an alarm signal according to the first magnetic field signal, the second magnetic field signal and the third magnetic field signal.

One embodiment of the present disclosure further provides a method for detecting a tubing coupling by using the ferromagnetic object detection device provided by any one of the above embodiments, including: the magnetic field generating device generates a magnetic field in the space of the support tube; upon a tubing passing through the space of the support tube in the first direction, the first magnetic field detection element detects and obtains a first magnetic field signal to obtain a moving speed of the tubing in the first direction; the second magnetic field detection element detects and obtains a second magnetic field signal to obtain a size of the tubing in the second direction; and the third magnetic field detection element detects and obtains a third magnetic field signal to obtain a position of a coupling of the tubing.

In some examples, the method for detecting a tubing coupling further includes: correcting the second magnetic field signal by combining the first magnetic field signal, comparing the second magnetic field signal after correction with a preset contour signal to obtain a first signal difference, judging that the tubing is in a normal state upon the first signal difference being smaller than a preset signal difference; and judging that the tubing is in an abnormal state and sending an alarm signal upon the first signal difference being greater than or equal to the preset signal difference.

In some examples, after the third magnetic field signal generates a step signal every time, entering a next stage of detection; and taking the second magnetic field signal after correction as the preset contour signal in the next stage of detection.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 1:
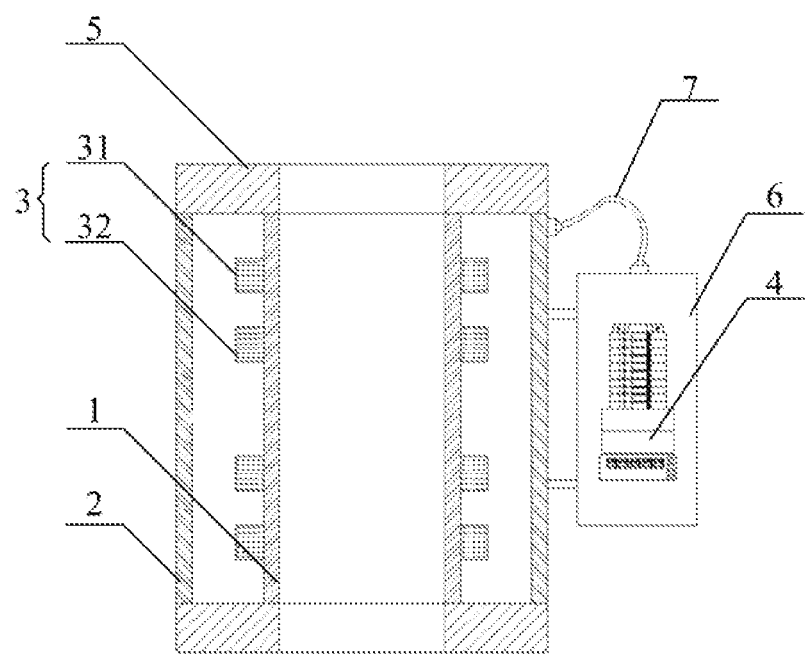
FIG. 1 is a structural schematic diagram of a detection device of a tubing coupling.

FIG. 1 is a structural schematic diagram of a detection device of a tubing coupling, the detection device of a tubing coupling is used for detecting the position of the tubing coupling. As illustrated in FIG. 1, the detection device of a tubing coupling includes an excitation coil 31, a detection coil 32 matched with the excitation coil 31, and other components. The detection principle is: because the different wall thicknesses of the tubing and the coupling, upon the tubing and the coupling passing through the detection coil 32, the changes of induced electromotive force in the detection coil are different, and the tubing and the coupling can be distinguished by detecting the changes of the induced electromotive force.

However, the detection device can judge whether a coupling passes through according to the change of induced electromotive force in the detection coil, and upon the tubing shaking or impurities such as oil stains being existed, the change of induced electromotive force in the detection coil may be the same as or close to that of the coupling, which easily leads to misjudgment of the detection device. Thus, the detection device of a tubing coupling cannot accurately detect the tubing coupling.

Embodiments of the present disclosure provide a ferromagnetic object detection device and a method for detecting a tubing coupling. The ferromagnetic object detection device includes a support tube, a magnetic field generating device and a magnetic field detection device. The support tube includes a space penetrating in the first direction; the magnetic field generating device is located on an outer sidewall of the support tube and is configured to generate a magnetic field; the magnetic field detection device includes a first magnetic field detection element, a second magnetic field detection element and a third magnetic field detection element. The first magnetic field detection element, the second magnetic field detection element and the third magnetic field detection element are all located on the outer sidewall of the support tube and within a range of the magnetic field generated by the magnetic field generating device. The first magnetic field detection element is configured to detect a magnetic field and obtain a first magnetic field signal to obtain a moving speed of the ferromagnetic object passing through the space in the first direction; the second magnetic field detection element is configured to detect a magnetic field and obtain a second magnetic field signal to obtain a size of the ferromagnetic object in a second direction perpendicular to the first direction; the third magnetic field detection element is configured to detect a magnetic field and obtain a third magnetic field signal to obtain a position of the ferromagnetic object.

In the ferromagnetic object detection device provided by the embodiment of the present disclosure, the magnetic field detection device includes a first magnetic field detection element, a second magnetic field detection element and a third magnetic field detection element, which can respectively detect and obtain the moving speed, size and position of the ferromagnetic object passing through the detection device, thereby achieving accurate detection of the ferromagnetic object.

Hereinafter, the ferromagnetic object detection device and the method for detecting the tubing coupling provided by the embodiments of the present disclosure will be described in detail with reference to the accompanying drawings. It should be noted that the same reference numeral in different drawings are used to refer to the described elements with the same or similar structure.

Figure 2:
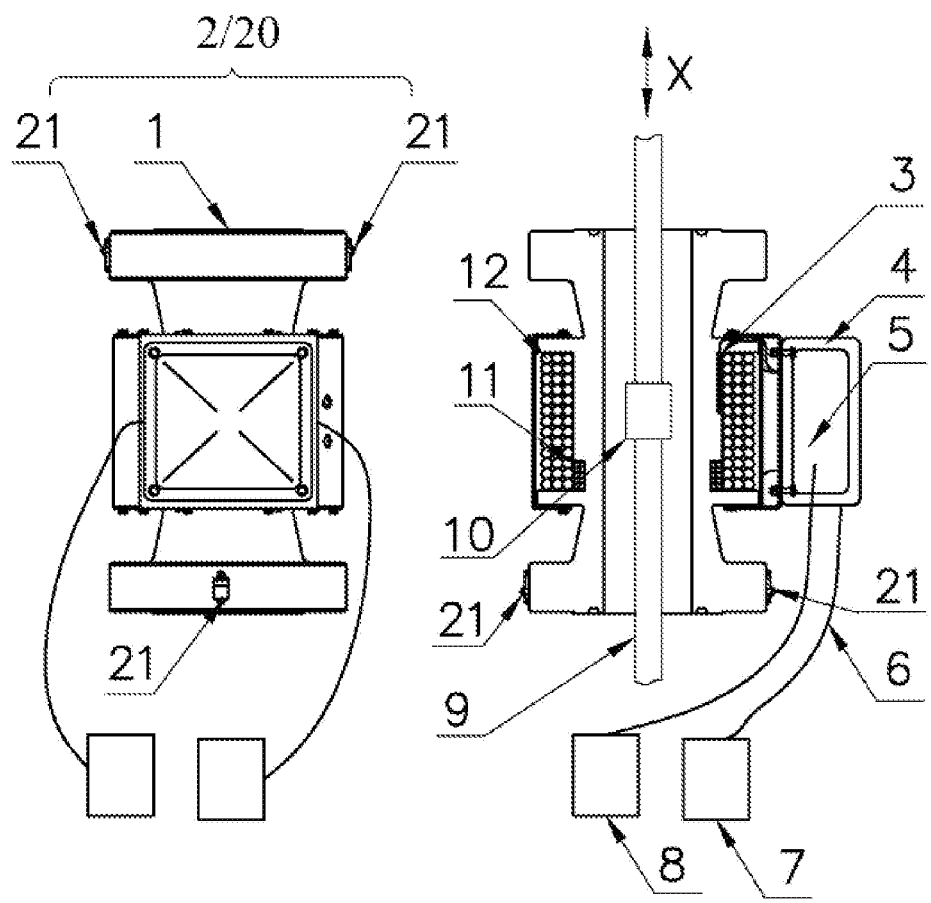
FIG. 2 is a structural schematic diagram of a ferromagnetic object detection device according to an embodiment of the present disclosure.

An embodiment of the present disclosure provides a ferromagnetic object detection device. FIG. 2 is a structural schematic diagram of a ferromagnetic object detection device according to an embodiment of the present disclosure, in which the left drawing is a planar structural schematic diagram and the right drawing is a sectional structural schematic diagram of the left drawing. The ferromagnetic object detection device is used for detecting the position, size and other information of the ferromagnetic object passing through the ferromagnetic object detection device.

It should be noted that a ferromagnetic object has an influence on the magnetic field in which it is located, and the required information of the ferromagnetic object can be obtained by detecting the change of the magnetic field in the position where the ferromagnetic object is located. The ferromagnetic object can be, for example, an object containing one or more elements selected from the group consisting of iron, cobalt, nickel and gadolinium, or an alloy or compound selected from the abovementioned elements.

In the field of oil and gas field development, tubing is a very common tool. The main material of a tubing and its coupling is steel, which belongs to ferromagnetic material. The ferromagnetic object detection device provided by the embodiments of the present disclosure can be used for detecting the tubing and its coupling. For convenience of description, in the following, the embodiments of the present disclosure will describe the tubing and its coupling as ferromagnetic objects to be detected. However, it should be noted that the ferromagnetic object detection device provided by the embodiments of the present disclosure can detect not only the tubing and its coupling, but also other ferromagnetic objects.

As illustrated in FIG. 2, the ferromagnetic object detection device includes a support tube 1, a magnetic field generating device 12 and a magnetic field detection device 11, 2 and 3. The support tube 1 includes a space penetrating in the first direction X, and the tubing 9 and its coupling 10 can pass through the space in the first direction X. The magnetic field generating device 12 is located on an outer sidewall of the support tube 1 and is configured to generate a magnetic field. The magnetic field detection device 11, 2 and 3 include a first magnetic field detection element 11, a second magnetic field detection element 2 and a third magnetic field detection element 3. The first magnetic field detection element 11, the second magnetic field detection element 2 and the third magnetic field detection element 3 are all located on the outer sidewall of the support tube 1 and within a range of the magnetic field generated by the magnetic field generating device 12.

The first magnetic field detection element 11 is configured to detect a magnetic field and obtain a first magnetic field signal, so as to obtain a moving speed of the tubing 9 and its coupling 10 passing through the space of the support tube 1 in the first direction X; the second magnetic field detection element 2 is configured to detect a magnetic field and obtain a second magnetic field signal, so as to obtain a size of the tubing 9 and its coupling 10 in a second direction perpendicular to the first direction X; the third magnetic field detection element 3 is configured to detect a magnetic field and obtain a third magnetic field signal to obtain a position of the tubing 9 and its coupling 10.

In the ferromagnetic object detection device provided by the embodiment of the present disclosure, the magnetic field detection devices 11, 2 and 3 include the first magnetic field detection element 11, the second magnetic field detection element 2 and the third magnetic field detection element 3. The first magnetic field detection element 11 can obtain the moving speed of the tubing 9 and its coupling 10 in the first direction X, the second magnetic field detection element 2 can obtain the size of the tubing 9 and its coupling 10, and the third magnetic field detection element 3 can obtain the positions of the tubing 9 and its coupling 10, so that the ferromagnetic object detection device can accurately detect the tubing 9 and its coupling 10.

The ferromagnetic object detection device provided by the embodiment of the present disclosure can be applied to the lifting or lowering operation of tubing in the workover or logging process, and is used for detecting information such as the position, moving speed, contour size and the like of the tubing and the coupling. For example, the detection device can be installed in a wellhead device on the ground. Upon the tubing and its coupling passing through the detection device, the magnetic field changes. By detecting the change of the magnetic field, information such as the position, moving speed and contour size of the tubing and coupling can be obtained, thus providing information for workover or logging operation.

In some examples, as illustrated in FIG. 2, the space penetrating the support tube 1 in the first direction X can be, for example, a cylindrical space located in the middle of the support tube 1. Embodiments of the present disclosure include but are not limited thereto. For example, the space can also be rectangular parallelepiped, elliptical cylinder and other shapes as long as it can allow the tubing 9 and its coupling 10 to pass through.

For example, a main body of the support tube 1 is made of metal, and the inner space of the support tube 1 can bear a large pressure, while other components of the detection device, such as the magnetic field generating device and the magnetic field detection device, are isolated from the inner space by the outer sidewall of the support tube and will not be affected by the inner pressure. Therefore, the detection device can be used to detect the tubing and the coupling during well no-killing operation (operating when there is pressure in oil and gas well), and has a wide application range.

Figure 3:
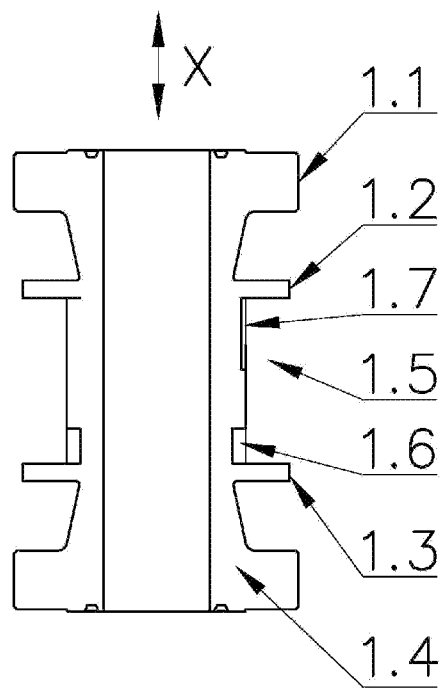
FIG. 3 is a structural schematic diagram of a support tube in a ferromagnetic object detection device according to an embodiment of the present disclosure.

FIG. 3 is a structural schematic diagram of the support tube. As illustrated in FIG. 3, the support tube 1 includes a first connection end 1.1 and a second connection end 1.4, the first connection end 1.1 and the second connection end 1.4 are oppositely arranged in the first direction X. The first connection end 1.1 and the second connection end 1.4 can be flanges or other connecting structures. Through the first connection end 1.1 and the second connection end 1.4, the support tube 1 can be fixedly connected to the wellhead device and the internal space of the support tube 1 is isolated from the outside.

In some examples, as illustrated in FIG. 2 and FIG. 3, the support tube 1 further includes a first barrier plate 1.2 and a second barrier plate 1.3 arranged on the outer sidewall at intervals. In the first direction X, the first barrier plate 1.2 and the second barrier plate 1.3 are located between the first connection end 1.1 and the second connection end 1.4, and a first annular groove 1.5 is provided between the first barrier plate 1.2 and the second barrier plate 1.3, and the magnetic field generating device 12 is wound in the first annular groove 1.5.

In some examples, as illustrated in FIGS. 2 and 3, the support tube 1 further includes a second annular groove 1.6, the second annular groove 1.6 is recessed from the bottom of the first annular groove 1.5 to the inner space of the support tube 1 in the second direction. The first magnetic field detection element 11 is wound in the second annular groove 1.6. For example, as illustrated in FIG. 3, in the first direction X, the second annular groove 1.6 is located between the first barrier plate 1.2 and the second barrier plate 1.3, and at a side close to the second barrier plate 1.3.

For example, as illustrated in FIG. 2 and FIG. 3, the support tube 1 further includes a mounting groove 1.7 which is recessed from the bottom of the first annular groove 1.5 to the inner space of the support tube 1 in the second direction. A third magnetic field detection element 3 is arranged in the mounting groove 1.7. For example, as illustrated in FIG. 3, in the first direction X, the mounting groove 1.7 is located between the first barrier plate 1.2 and the second barrier plate 1.3, and is located on a side close to the first barrier plate 1.2.

In some examples, as illustrated in FIG. 2, the magnetic field generating device 12 is an excitation coil. The excitation coil is wound around the outer sidewall of the support tube 1 in a certain manner, for example, uniformly wound around the outer sidewall of the support tube 1 around the central axis of the support tube 1 in the first direction X. For example, the excitation coil is powered by a constant current source, so that the excitation coil can generate a stable quantitative magnetic field in the space inside the support tube. It should be noted that the magnetic field generating device can also adopt other structures for generating excitation magnetic fields, such as various types of permanent magnets, alternating magnetic fields, geomagnetism, etc., which are not limited by the embodiments of the present disclosure.

In some examples, the first magnetic field detection element 11 is a detection coil 11. For example, as illustrated in FIG. 2, the detection coil 11 can be wound and fixed at an inner side of the magnetic field generating device 12, that is, in a second direction perpendicular to the first direction X, the detection coil 11 is located between the support tube 1 and the magnetic field generating device 12. The first direction X can be the axial direction of the support tube 1 and the second direction can be the radial direction of the support tube 1.

Upon the tubing coupling passing through the detection device, the detection coil detects the change of the magnetic field in the space to obtain the first magnetic field signal, which can reflect a moving speed of the tubing in the first direction X, and the first magnetic field signal can be used as a speed component in the tubing detection algorithm. For example, the first magnetic field signal can be an induced electromotive force generated in the detection coil or other scaled values corresponding to the induced electromotive force. Upon the tubing coupling passing through the detection device, the magnetic flux of the detection coil changes, and the induced electromotive force is generated in the detection coil, and the amplitude of the induced electromotive force corresponds to the moving speed of the tubing in the first direction X.

For another example, the detection coil 11 can also be arranged in parallel with the magnetic field generating device 12 in the first direction X. In this case, the detection coil 11 can also detect the magnetic field change caused by the tubing coupling passing through and obtain the first magnetic field signal.

For example, the detection coil 11 can be composed of a plurality of sets of coils wound between the excitation coil and the support tube.

The second magnetic field detection element 2 includes at least one magnetic sensor group 20, each magnetic sensor group 20 includes two first magnetic sensors 21, and the two first magnetic sensors 21 are symmetrically arranged about the central axis of the support tube 1.

The first magnetic sensor is a device for detecting a magnetic field according to Hall effect. Hall effect refers that when an electrified carrier is acted by an external magnetic field perpendicular to a plane of the carrier, the carriers are acted by Lorentz force and tend to gather to two sides, and a potential difference is formed because of the aggregation of free electrons (one side is more, and the other side must be less).

By arranging the two first magnetic sensors 21 in groups and symmetrically arranging the two first magnetic sensors 21 about the central axis of the support tube 1, magnetic field signals in different directions at the same position can be extracted, and can be used as the contour signals of the coupling after interference signals being filtered out. For example, the two first magnetic sensors in each group are located in the same cross section in the axial direction and symmetrically arranged in the radial direction, and the surfaces for detecting magnetic field N pole and magnetic field S pole are both arranged towards the inner side, so that the interference caused by the shaking of the tubing and the coupling in the space can be eliminated. The first magnetic sensor 21 detects the change of the magnetic field to obtain a second magnetic field signal, which can reflect the contour size (for example, diameter) of the tubing and its coupling in the second direction, and can be used as a size component in the tubing detection algorithm.

For example, as illustrated in FIG. 2, the second magnetic field detection element 2 includes two magnetic sensor groups 20, which are arranged on two sides of the magnetic field generating device 12 in the first direction X. For example, as illustrated in FIG. 2, in the first direction X, two magnetic sensor groups 20 are located on a lateral side of the first connection end 1.1 and a lateral side of the second connection end 1.4, respectively, and the magnetic field generating device 12 is located in the first annular groove 1.5 between the first barrier plate 1.2 and the second barrier plate 1.3.

It should be noted that, in FIG. 2, the installation position of the second magnetic field detection element 2 is only an example, and the embodiment of the present disclosure does not limit the installation position of the second magnetic field detection element 2. For example, the second magnetic field detection element 2 can also be located at the inner side the magnetic field generating device 12, that is, in the second direction, the second magnetic field detection element 2 can overlap with the magnetic field generating device 12 and be located on a side close to the inner space.

For example, as illustrated in FIG. 2, each magnetic sensor group 20 includes two first magnetic sensors 21, and the two first magnetic sensors 21 are symmetrically arranged about the central axis of the support tube 1. In FIG. 2, the two first magnetic sensors 21 located at the upper part of the support tube are of one group, and the two first magnetic sensors 21 located at the lower part of the support tube are of another group.

Embodiments of the present disclosure do not limit the number of magnetic sensor groups. For example, the second magnetic field detection element 2 can only include one magnetic sensor group 20, which can be arranged at any position of the support tube 1 in the first direction X. For another example, the second magnetic field detection element 2 can also include three or more magnetic sensor groups, and the three or more magnetic sensor groups 20 are arranged at intervals in the first direction, for example, they can be arranged on two sides of the magnetic field generating device 12 in the first direction or inside the magnetic field generating device 12.

Figure 4:
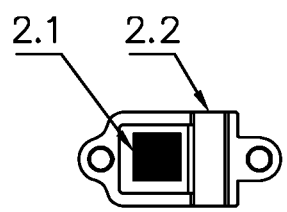
FIG. 4 is a structural schematic diagram of a first magnetic sensor in a ferromagnetic object detection device according to an embodiment of the present disclosure.
Figure 4:

FIG. 4 is a structural schematic diagram of the first magnetic sensor. For example, as illustrated in FIG. 4, each first magnetic sensor 21 includes a magnetic sensitive array 2.1 and a housing 2.2, wherein the magnetic sensitive array 2.1 plays a role in detecting a magnetic field, and the housing 2.2 is used for supporting the magnetic sensitive array 2.1 and connecting with an object to be detected.

Figure 5:
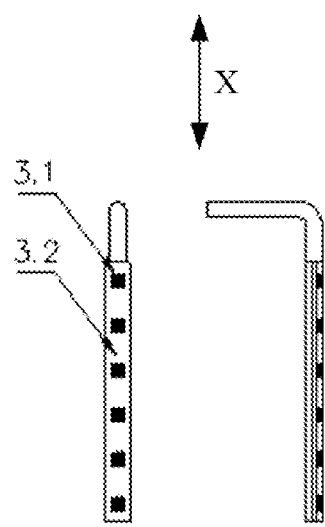
FIG. 5 is a structural schematic diagram of a third magnetic field detection element in a ferromagnetic object detection device according to an embodiment of the present disclosure.

FIG. 5 is a structural schematic diagram of the third magnetic field detection element. As illustrated in FIG. 5, the third magnetic field detection element 3 includes a circuit board 3.2, and a plurality of second magnetic sensors 3.1 arranged in sequence on the circuit board 3.2. For example, as illustrated in FIG. 2, after the third magnetic field detection element 3 is mounted on the ferromagnetic object detection device, the plurality of second magnetic sensors 3.1 are arranged in the first direction X. For example, the plurality of second magnetic sensors 3.1 are equidistantly arranged in the first direction X. Upon the coupling 10 passing through the detection device, the second magnetic sensor 3.1 detects the change of the magnetic field to obtain a third magnetic field signal, which will generate a larger step signal at the abnormal position of the tubing. For example, because the diameter of the coupling is larger than the diameter of the main body of the tubing, the third magnetic field signal will generate a larger step signal upon the coupling passing through, so the step signal can reflect the position of the tubing coupling and can be used as a time component in the tubing detection algorithm.

In some examples, as illustrated in FIG. 2, in the second direction, the third magnetic field detection element 3 is located between the support tube 1 and the magnetic field generating device 12; in the first direction X, the third magnetic field detection element 3 is spaced apart from the first magnetic field detection element 11.

In some examples, as illustrated in FIG. 2, the ferromagnetic object detection device further includes a controller 5 and an audible and visual alarm 7. The controller 5 is arranged on a controller bracket 4, and the audible and visual alarm 7 is used to send an alarm signal upon the coupling passing through. The audible and visual alarm 7 is in communication with the controller 5, and the controller 5 is in communication with the first magnetic field detection element 11, the second magnetic field detection element 2 and the third magnetic field detection element 3, respectively. The controller 5 is configured to control whether the audible and visual alarm 7 sends out an alarm signal according to the first magnetic field signal, the second magnetic field signal and the third magnetic field signal. For example, the controller 5 can judge whether the coupling passes according to the first magnetic field signal, the second magnetic field signal and the third magnetic field signal, and control the audible and visual alarm 7 to send an alarm signal if the coupling passes.

An embodiment of the present disclosure further provides a method for detecting a tubing coupling, which uses the ferromagnetic object detection device provided by any of the above embodiments for detection, and the method includes:

The magnetic field generating device 12 generates a magnetic field in the space of the support tube 1;

Upon the tubing 9 and its coupling 10 passing through the space of the support tube 1 in the first direction X, the first magnetic field detection element 11 detects and obtains a first magnetic field signal to obtain moving speeds of the tubing 9 and its coupling 10 in the first direction X; the second magnetic field detection element 2 detects and obtains a second magnetic field signal to obtain sizes of the tubing 9 and its coupling 10 in the second direction; the third magnetic field detection element 3 detects and obtains a third magnetic field signal to obtain a position of the coupling 10.

In the method for detecting the tubing coupling provided by the embodiment of the present disclosure, the first magnetic field detection element 11 can obtain the moving speeds of the tubing 9 and its coupling 10 in the first direction X, the second magnetic field detection element 2 can obtain the size of the tubing 9 and its coupling 10, and the third magnetic field detection element 3 can obtain the positions of the tubing 9 and its coupling 10, so that the ferromagnetic object detection device can accurately detect the tubing 9 and its coupling 10.

The method for detecting the tubing coupling provided by the embodiment of the present disclosure can be applied to the lifting or lowering operation of tubing in the workover or logging process, and provides information for the workover or logging operation.

In some examples, the method for detecting the tubing coupling provided by the embodiment of the present disclosure further includes:

Correcting the second magnetic field signal by combining the first magnetic field signal, comparing the second magnetic field signal after correction with a preset contour signal to obtain a first signal difference, judging that the tubing is in a normal state upon the first signal difference being smaller than the preset signal difference; and judging that the tubing is in an abnormal state and sending an alarm signal upon the first signal difference being greater than or equal to the preset signal difference. The preset contour signal reflects the initial diameter size of the main body of the tubing; the preset signal difference reflects the allowable diameter deviation between the coupling and the main body of the tubing.

In some examples, the method for detecting the tubing coupling provided by the embodiment of the present disclosure further includes: after the third magnetic field signal generating a step signal every time, entering a next stage of detection; and taking the second magnetic field signal after correction as the preset contour signal in the next stage of detection.

Because the couplings are distributed at intervals in the extension direction of the tubing, the second magnetic field signal obtained by the detection device will change by stages. After it is detected that a coupling passes in each stage, the last corrected second magnetic field signal is used as the preset contour signal in the next stage of detection. In this way, the second magnetic field signal can be updated in real time, which avoids the periodic and cumulative differences caused by different thicknesses of different sections of the tubing, and improves the detection accuracy.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

The invention claimed is:

1. A ferromagnetic object detection device, comprising:
a support tube, comprising a space penetrating therethrough in a first direction;
a magnetic field generating device, located on an outer sidewall of the support tube and configured to generate a magnetic field; and
a magnetic field detection device, comprising a first magnetic field detection element, a second magnetic field detection element and a third magnetic field detection element,
wherein the first magnetic field detection element, the second magnetic field detection element and the third magnetic field detection element are all located on the outer sidewall of the support tube and within a range of the magnetic field generated by the magnetic field generating device;
the first magnetic field detection element is configured to detect the magnetic field and obtain a first magnetic field signal to obtain a moving speed of a ferromagnetic object passing through the space in the first direction, the second magnetic field detection element is configured to detect the magnetic field and obtain a second magnetic field signal to obtain a size of the ferromagnetic object in a second direction perpendicular to the first direction, and the third magnetic field detection element is configured to detect the magnetic field and obtain a third magnetic field signal to obtain a position of the ferromagnetic object.

2. The ferromagnetic object detection device according to claim 1, wherein the magnetic field generating device is an excitation coil, the excitation coil is wound on the outer sidewall of the support tube.

3. The ferromagnetic object detection device according to claim 1, wherein the first magnetic field detection element is a detection coil, and in the second direction, the detection coil is located between the support tube and the magnetic field generating device.

4. The ferromagnetic object detection device according to claim 1, wherein the second magnetic field detection element comprises at least one magnetic sensor group, and each magnetic sensor group comprises two first magnetic sensors which are symmetrically arranged about the central axis of the support tube.

5. The ferromagnetic object detection device according to claim 4, wherein the second magnetic field detection element comprises a plurality of magnetic sensor groups, the plurality of magnetic sensor groups are arranged on two sides of the magnetic field generating device in the first direction.

6. The ferromagnetic object detection device according to claim 1, wherein the third magnetic field detection element comprises a plurality of second magnetic sensors arranged in the first direction.

7. The ferromagnetic object detection device according to claim 6, wherein the plurality of second magnetic sensors are equidistantly arranged in the first direction.

8. The ferromagnetic object detection device according to claim 1, wherein in the second direction, the third magnetic field detection element is located between the support tube and the magnetic field generating device; in the first direction, the third magnetic field detection element is spaced apart from the first magnetic field detection element.

9. The ferromagnetic object detection device according to claim 1, wherein the support tube comprises a first connection end and a second connection end which are oppositely arranged in the first direction.

10. The ferromagnetic object detection device according to claim 9, wherein the support tube further comprises a first barrier plate and a second barrier plate which are arranged on the outer sidewall at intervals, in the first direction, the first barrier plate and the second barrier plate are located between the first connection end and the second connection end, a first annular groove is formed between the first barrier plate and the second barrier plate, and the magnetic field generating device is wound in the first annular groove.

11. The ferromagnetic object detection device according to claim 10, wherein the support tube further comprises a second annular groove, the second annular groove is recessed from a bottom of the first annular groove to the space in the second direction, and the first magnetic field detection element is wound in the second annular groove.

12. The ferromagnetic object detection device according to claim 1, further comprising a controller and an audible and visual alarm, wherein the audible and visual alarm is in communication connection with the controller, and the controller is respectively in communication connection with the first magnetic field detection element, the second magnetic field detection element and the third magnetic field detection element, and the controller is configured to control whether the audible and visual alarm sends an alarm signal according to the first magnetic field signal, the second magnetic field signal and the third magnetic field signal.

13. A method for detecting a tubing coupling by using the ferromagnetic object detection device according to claim 1, comprising:
the magnetic field generating device generates a magnetic field in the space of the support tube;
upon a tubing passing through the space of the support tube in the first direction, the first magnetic field detection element detects and obtains a first magnetic field signal to obtain a moving speed of the tubing in the first direction; the second magnetic field detection element detects and obtains a second magnetic field signal to obtain a size of the tubing in the second direction; and the third magnetic field detection element detects and obtains a third magnetic field signal to obtain a position of a coupling of the tubing.

14. The method for detecting the tubing coupling according to claim 13, further comprising:
correcting the second magnetic field signal by combining the first magnetic field signal, comparing the second magnetic field signal after correction with a preset contour signal to obtain a first signal difference, judging that the tubing is in a normal state upon the first signal difference being smaller than a preset signal difference; and judging that the tubing is in an abnormal state and sending an alarm signal upon the first signal difference being greater than or equal to the preset signal difference.

15. The method for detecting the tubing coupling according to claim 14, wherein after the third magnetic field signal generates a step signal every time, entering a next stage of detection; and taking the second magnetic field signal after correction as the preset contour signal in the next stage of detection.

* * * * *